US012249050B2

(12) United States Patent
Strandborg et al.

(10) Patent No.: US 12,249,050 B2
(45) Date of Patent: Mar. 11, 2025

(54) EXTENDED DEPTH-OF-FIELD CORRECTION USING RECONSTRUCTED DEPTH MAP

(71) Applicant: Varjo Technologies Oy, Helsinki (FI)

(72) Inventors: Mikko Strandborg, Hangonkylä (FI); Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 220 days.

(21) Appl. No.: 17/991,531

(22) Filed: Nov. 21, 2022

(65) Prior Publication Data
US 2024/0169494 A1    May 23, 2024

(51) Int. Cl.
| | |
|---|---|
| G06T 5/73 | (2024.01) |
| G06F 3/01 | (2006.01) |
| G06T 5/20 | (2006.01) |
| G06T 7/50 | (2017.01) |
| G06T 7/80 | (2017.01) |
| G06T 15/20 | (2011.01) |
| G06T 17/00 | (2006.01) |

(52) U.S. Cl.
CPC ............... *G06T 5/73* (2024.01); *G06F 3/013* (2013.01); *G06T 5/20* (2013.01); *G06T 7/50* (2017.01); *G06T 7/80* (2017.01); *G06T 15/20* (2013.01); *G06T 17/00* (2013.01); *G06T 2207/20084* (2013.01)

(58) Field of Classification Search
CPC .... G06T 5/73; G06T 5/20; G06T 7/50; G06T 15/20; G06T 7/80; G06T 2207/20084; G06T 17/00; G06F 3/013
See application file for complete search history.

(56) References Cited

U.S. PATENT DOCUMENTS

| | | | | |
|---|---|---|---|---|
| 9,445,003 | B1* | 9/2016 | Lescu .............. | H04N 23/6812 |
| 11,650,421 | B1* | 5/2023 | Erkelens ............ | G02B 27/0172 |
| | | | | 345/633 |
| 2014/0293016 | A1* | 10/2014 | Benhimane ............ | G06T 7/246 |
| | | | | 348/50 |
| 2015/0116353 | A1 | 4/2015 | Miura et al. | |

(Continued)

FOREIGN PATENT DOCUMENTS

CN        110738677 A       1/2020

OTHER PUBLICATIONS

Tan et al, "EDOF-ToF: extended depth of field time-of-flight imaging", Optics Express, vol. 29, No. 23, https://doi.org/10.1364/OE.441515, Nov. 8, 2021, 17 pages.

(Continued)

*Primary Examiner* — Phi Hoang
(74) *Attorney, Agent, or Firm* — Ziegler IP Law Group, LLC.

(57) ABSTRACT

A computer-implemented method includes obtaining 3D model of real-world environment; receiving image of real-world environment captured using camera and pose information indicative of camera pose from which image is captured; utilising 3D model of real-world environment to generate reconstructed depth map from perspective of camera pose; and applying extended depth-of-field correction to image segment(s) of image that is/are out of focus, by using point spread function determined for camera, based on optical depths in segment(s) of reconstructed depth map corresponding to image segment(s) of image.

11 Claims, 2 Drawing Sheets

(56) References Cited

U.S. PATENT DOCUMENTS

| | | | | |
|---|---|---|---|---|
| 2018/0143419 A1* | 5/2018 | Bryll | .................... | G02F 1/113 |
| 2019/0158803 A1* | 5/2019 | Mizukura | ........ | A61B 1/000095 |
| 2020/0378999 A1* | 12/2020 | Heidrich | ................ | G01S 11/12 |
| 2021/0056349 A1* | 2/2021 | Knaan | .................... | G06T 7/593 |
| 2021/0295476 A1 | 9/2021 | Slutsky et al. | | |
| 2022/0375045 A1* | 11/2022 | Wu | ..................... | H04N 25/615 |

OTHER PUBLICATIONS

European Patent Office, Extended European Search Report, Application No. 23206917.9, mailed Apr. 9, 2024, 5 pages.

Liu et al. "Construction of all-in-focus images assisted by depth sensing" arixiv.org, Cornell University Library, Jun. 5, 2018, 18 pages.

* cited by examiner

EXTENDED DEPTH-OF-FIELD CORRECTION USING RECONSTRUCTED DEPTH MAP

TECHNICAL FIELD

The present disclosure relates to computer-implemented methods incorporating extended depth-of-field (EDOF) correction using reconstructed depth maps. The present disclosure also relates to systems incorporating EDOF correction using reconstructed depth maps. The present disclosure further relates to computer program products incorporating EDOF correction using reconstructed depth maps.

BACKGROUND

Nowadays, with increase in number of images being captured every day, there is an increased demand for image processing, specifically for image enhancement. Such a demand may, for example, be quite high and critical in case of evolving technologies such as immersive extended-reality (XR) technologies, which are being employed in various fields such as entertainment, real estate, training, medical imaging operations, simulators, navigation, and the like. Such immersive XR technologies create XR environments for presentation to users of XR devices (such as XR headsets, pairs of XR glasses, or similar). Generally, the image processing is used to perform certain operations on the images captured by a camera to ensure that the images convey useful and rich visual information throughout their fields of view.

Despite progress in cameras used for image capturing, existing techniques and equipment for image generation have several limitations associated therewith. Firstly, cameras that are used for image capturing typically suffer from depth-of-field issues. Such depth-of-field issues can be resolved to some extent by adjusting a size of an aperture of a given camera. However, when the size of the aperture of the given camera is significantly smaller, images of a real-world environment in a low-light setting are not captured properly by the given camera. Moreover, when the size of the aperture of the given camera is significantly larger, images of the real-world environment are sharply captured only within a short focusing distance range of the given camera, and are captured blurred outside this focusing distance range. Furthermore, even when an auto-focus camera is employed for capturing the images, it is still not possible to capture sharp (i.e., in-focus) images in an entire field of view, because the auto-focus camera can be adjusted according to only one focusing distance range at a time. Therefore, the generated images are of low quality and unrealistic, and are often generated with considerable latency/delay. Secondly, some existing techniques and equipment exclusively rely on depth cameras for capturing depth information of the real-world environment in order to correct images (for example, having defocus blur). However, such depth information is generally unreliable and inaccurate because of similar depth-of-field issues in the depth cameras. Thus, image correction (such as image deblurring) lacks a required resolution, which is necessary for high-fidelity image generation, as it is not always possible to employ depth cameras, for example, in interest of minimizing an overall cost, power consumption, fault susceptibilities, and the like.

Therefore, in light of the foregoing discussion, there exists a need to overcome the aforementioned drawbacks associated with existing equipment and techniques for image generation.

SUMMARY

The present disclosure seeks to provide a computer-implemented method incorporating extended depth-of-field (EDOF) correction using reconstructed depth map. The present disclosure also seeks to provide a system incorporating EDOF correction using reconstructed depth map.

The present disclosure further seeks to provide a computer program product incorporating EDOF correction using reconstructed depth map. An aim of the present disclosure is to provide a solution that overcomes at least partially the problems encountered in prior art.

In a first aspect, an embodiment of the present disclosure provides a computer-implemented method comprising:
  obtaining a three-dimensional (3D) model of a real-world environment;
  receiving a given image of the real-world environment captured using a given camera, and pose information indicative of a given camera pose from which the given image is captured;
  utilising the 3D model of the real-world environment to generate a reconstructed depth map from a perspective of the given camera pose; and
  applying an extended depth-of-field correction to at least one image segment of the given image that is out of focus, by using a point spread function determined for the given camera, based on optical depths in at least one segment of the reconstructed depth map corresponding to the at least one image segment of the given image.

In a second aspect, an embodiment of the present disclosure provides a system comprising at least one server configured to:
  obtain a three-dimensional (3D) model of a real-world environment;
  receive a given image of the real-world environment captured using a given camera, and pose information indicative of a given camera pose from which the given image is captured;
  utilise the 3D model of the real-world environment to generate a reconstructed depth map from a perspective of the given camera pose; and
  apply an extended depth-of-field correction to at least one image segment of the given image that is out of focus, by using a point spread function determined for the given camera, based on optical depths in at least one segment of the reconstructed depth map corresponding to the at least one image segment of the given image.

In a third aspect, the present disclosure provides a computer program product comprising a non-transitory machine-readable data storage medium having stored thereon program instructions that, when executed by a processor, cause the processor to execute steps of a computer-implemented method of the first aspect.

Embodiments of the present disclosure substantially eliminate or at least partially address the aforementioned problems in the prior art, and facilitate a simple, fast, accurate, and improved image deblurring by way of using reconstructed depth map, thereby generating images having high realism and high visual fidelity, in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a computer-implemented method comprising:
obtaining a three-dimensional (3D) model of a real-world environment;
receiving a given image of the real-world environment captured using a given camera, and pose information indicative of a given camera pose from which the given image is captured;
utilising the 3D model of the real-world environment to generate a reconstructed depth map from a perspective of the given camera pose; and
applying an extended depth-of-field correction to at least one image segment of the given image that is out of focus, by using a point spread function determined for the given camera, based on optical depths in at least one segment of the reconstructed depth map corresponding to the at least one image segment of the given image.

In a second aspect, an embodiment of the present disclosure provides a system comprising at least one server configured to:
obtain a three-dimensional (3D) model of a real-world environment;
receive a given image of the real-world environment captured using a given camera, and pose information indicative of a given camera pose from which the given image is captured;
utilise the 3D model of the real-world environment to generate a reconstructed depth map from a perspective of the given camera pose; and
apply an extended depth-of-field correction to at least one image segment of the given image that is out of focus, by using a point spread function determined for the given camera, based on optical depths in at least one segment of the reconstructed depth map corresponding to the at least one image segment of the given image.

In a third aspect, the present disclosure provides a computer program product comprising a non-transitory machine-readable data storage medium having stored thereon program instructions that, when executed by a processor, cause the processor to execute steps of a computer-implemented method of the first aspect.

The present disclosure provides the aforementioned method, the aforementioned system, and the aforementioned computer program product for facilitating a simple, fast, accurate, and improved image deblurring by way of using reconstructed depth maps, thereby generating images having high realism and high visual fidelity. Herein, the reconstructed depth map is used for knowing accurate and reliable optical depths in the at least one segment of the given image that is out of focus (namely, blurred), and then the point spread function (which is determined for the given camera) is used for applying the extended depth-of-field (EDOF) correction to the at least one image segment. In this way, high-quality and accurate images are generated in real time or near-real time even when both visible-light cameras as well as depth cameras suffer from depth-of-field issues. The method and the system do not necessarily require depth cameras for sensing optical depths of objects, and conveniently rely on the reconstructed depth map (generated from the 3D model) for generating acceptably accurate deblurred images. EDOF-corrected images are accurate and realistic, for example, in terms of representing objects or their parts. This potentially leads to a realistic, immersive viewing experience for a user, when the images are displayed to the user. The method and the system are simple, robust, fast, reliable, support real-time high-quality image deblurring and can be implemented with ease.

Notably, the at least one server controls an overall operation of the system. In some implementations, the at least one server is implemented as a remote server. In an example, the remote server could be a cloud server that provides a cloud computing service. In other implementations, the at least one server is implemented as a processor of a device comprising at least the given camera, or as a processor of a computing device communicably coupled to said device. Examples of the device include, but are not limited to, a head-mounted display (HMD) device and a teleport device. Examples of the computing device include, but are not limited to, a laptop, a desktop, a tablet, a phablet, a personal digital assistant, a workstation, and a console.

The term "head-mounted display" device refers to a specialized equipment that is configured to present an extended-reality (XR) environment to a user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses virtual reality (VR), augmented reality (AR), mixed reality (MR), and the like. The term "teleport device" refers to a specialized equipment that is capable of facilitating virtual teleportation.

It will be appreciated that the term "at least one server" refers to "a single server" in some implementations, and to "a plurality of servers" in other implementations. When the system comprises the single server, all operations of the system could be performed by the single server. When the system comprises the plurality of servers, different operations of the system could be performed by different (and specially configured) servers from amongst the plurality of servers. As an example, a first server from amongst the plurality of servers may be configured to utilise the 3D model for generating the reconstructed depth map, and a second server from amongst the plurality of servers may be configured to apply the extended depth-of-field (EDOF) correction to the at least one image segment of the given image.

Throughout the present disclosure, the term "three-dimensional model" of the real-world environment refers to a data structure that comprises comprehensive information pertaining to a 3D space of the real-world environment. Such comprehensive information is indicative of at least one of: surfaces of objects or their parts present in the real-world environment, a plurality of features of the objects or their parts, shapes and sizes of the objects or their parts, poses of the objects or their parts, materials of the objects or their parts, colour information and depth information of the objects or their portions, light sources and lighting conditions within the real-world environment. The term "object" refers to a physical object or a part of the physical object present in the real-world environment. An object could be a living object (for example, such as a human, a pet, a plant, and the like) or a non-living object (for example, such as a wall, a window, a toy, a poster, a lamp, and the like). Examples of the plurality of features include, but are not limited to, edges, corners, blobs and ridges.

Optionally, the 3D model of the real-world environment is in form of at least one of: a 3D polygonal mesh, a 3D point cloud, a 3D surface cloud, a voxel-based model, a parametric model, a 3D grid, a 3D hierarchical grid, a bounding volume hierarchy, an image-based 3D model. The 3D polygonal mesh could be a 3D triangular mesh or a 3D quadrilateral mesh.

In an embodiment, the at least one server is configured to obtain the 3D model of the real-world environment from a data repository communicably coupled to the at least one server. In such a case, the 3D model of the real-world environment is pre-generated (for example, by the at least one server), and pre-stored in the data repository. It will be appreciated that the data repository could, for example, be implemented as a memory of the at least one server, a memory of the device, a memory of the computing device, a removable memory, a cloud-based database, or similar. Optionally, the system comprises the data repository.

In another embodiment, prior to obtaining the 3D model of the real-world environment, the at least one server is configured to generate the 3D model from a plurality of visible-light images and a plurality of depth maps (corresponding to the plurality of visible-light images), based on corresponding camera poses from which the plurality of visible-light images and the plurality of depth maps are captured. Optionally, the at least one server is configured to employ at least one data processing algorithm for processing the plurality of visible-light images to generate the 3D model. The at least one data processing algorithm could be at least one of: a feature extraction algorithm, an image stitching algorithm, an image merging algorithm, an interpolation algorithm, a 3D modelling algorithm, a photogrammetry algorithm, an image blending algorithm. Such data processing algorithms are well-known in the art. It will be appreciated that the plurality of visible-light images, the plurality of depth maps, and information pertaining to camera poses could be received by the at least one server from a device comprising pose-tracking means and at least one camera implemented as a combination of a visible-light and a depth camera, or from a data repository in which the plurality of visible-light images, the plurality of depth maps, and the information pertaining to camera poses are pre-stored.

Throughout the present disclosure, the term "camera" refers to an equipment that is operable to detect and process light signals received from the real-world environment, so as to capture images of the real-world environment. Optionally, the given camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Additionally, optionally, the given camera is implemented as a depth camera. Examples of the depth camera include, but are limited to, a Time-of-Flight (ToF) camera, a light detection and ranging (LiDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. The given camera is optionally implemented as a combination of the visible-light camera and the depth camera. The given camera may have a sensor chip having some phase detection autofocus (PDAF) pixels. Optionally, the given camera (or the device comprising the given camera) is communicably coupled to the at least one server.

It will be appreciated that the given image is a visual representation of the real-world environment. The term "visual representation" encompasses colour information represented in the given image, and additionally optionally other attributes associated with the given image (for example, such as depth information, luminance information, transparency information, and the like).

Optionally, the at least one server is configured to receive the given image from any one of:
  the given camera,
  the device comprising the given camera,
  the data repository in which the given image and the pose information are pre-stored.

Furthermore, the term "pose" encompasses both a position and an orientation. Optionally, in this regard, pose-tracking means is employed to detect and/or follow a pose of the given camera from which the given image is captured. Optionally, the at least one server is configured to receive the pose information from any one of:
  a device comprising pose-tracking means and the given camera, an external pose-tracking means,
the data repository in which the pose information is pre-stored along with the given image.

The pose tracking means may employ an outside-in tracking technique, an inside-out technique, or a combination of both the aforesaid techniques, for collecting pose-tracking data. Such techniques are well-known in the art. The pose-tracking data may be in form of at least one of: images, Inertial Measurement Unit (IMU) values, Time-Inertial Measurement Unit (TIMU) values, motion sensor data values, magnetic field strength values. Optionally, a processor of the device is configured to: process the pose-tracking data to determine a given camera pose of the given camera from which the given image is captured; and send, to the at least one server, the pose information indicative of the given pose of the given camera. Optionally, the processor of the device is configured to employ at least one data processing algorithm to process the pose-tracking data. Examples of the at least one data processing algorithm include a feature detection algorithm, an environment mapping algorithm, and a pose data extrapolation algorithm.

Notably, the reconstructed depth map is generated according to a viewpoint and a viewing direction of the given camera as indicated by the given camera pose. The reconstructed depth map represents depth information (for example, such as optical depths) pertaining to objects or their parts present in the real-world environment from the perspective of the given camera pose, said depth information being generated using the 3D model. Optionally, the reconstructed depth map is in form of a depth image comprising a plurality of pixels, wherein a pixel value of each pixel indicates an optical depth of its corresponding real point/region within the real-world environment.

Optionally, when utilising the 3D model to generate the reconstructed depth map, the at least one server is configured to employ at least one data processing algorithm. Optionally, in this regard, the at least one data processing algorithm enables in transforming a 3D point in the 3D model to a 2D point in the reconstructed depth map, from the perspective of the given camera pose. Optionally, the at least one data processing algorithm is at least one of: an image synthesis algorithm (such as an RGB-D image synthesis algorithm), a view synthesis algorithm, a rendering algorithm. Such data processing algorithms are well-known in the art. In an example, when the 3D model is in the form of a 3D polygonal mesh (for example, such as a 3D triangular mesh), the image synthesis algorithm may be a triangle rasterization algorithm. In another example, when the 3D model is in the form of a voxel-based model (such as a Truncated Signed Distance Field (TSDF) model), the image synthesis algorithm may be a ray-marching algorithm. In yet another example, when the 3D model is in the form of a 3D point cloud, the rendering algorithm may be a point cloud rendering algorithm, a point cloud splatting algorithm, an elliptical weighted-average surface splatting algorithm, or similar. Generating the reconstructed depth map using the 3D model is well-known in the art.

Using the reconstructed depth map for correcting a given image can be beneficial in a scenario where multiple cameras are present in a same real-world environment. For example, when a first camera and a second camera are present in a same real-world environment, the first camera may be implemented as a combination of a visible-light camera and a depth camera, and the second camera may be implemented as only a visible-light camera (i.e., it need not be implemented as the combination of the visible-light camera and the depth camera). In such a case, the visible-light images and the depth images captured by the first camera can be employed for generating the 3D model, which could be then utilised to obtain the reconstructed depth map. Then, images captured by the second camera can be corrected using a PSF of the second camera and reconstructed depth maps. Furthermore, using the reconstructed depth map for correcting the given image could also be beneficial as it compensates for depth-of-field issues and optical depth errors related to using depth cameras, especially when dynamic objects are present in the real-world environment, or when different materials having different reflective properties (for example, such as human hair that diffuses light, mirrors and other shiny surfaces having poor absorption) are present in the real-world environment.

Optionally, the computer-implemented method further comprises obtaining the point spread function determined for the given camera. Throughout the present disclosure, the term "point spread function" refers to responses of at least one optical element of a given camera to any one of: a point source, a point object. Ideally, the PSF is a two-dimensional (2D) diffraction pattern of light that is formed when an infinitely small point-like light source is imaged through the at least one optical element (for example, a lens system) of the given camera. A shape of the PSF is affected by optical properties of the at least one optical element, a distance between the infinitely small point-like light source and the at least one optical element, and a location of said light source within a field-of-view of the given camera. However, in practice, PSFs often appear like a Gaussian function, due to at least one of: diffraction of light, aberration of the at least one optical element, image sensing. The at least one optical element could be a lens of the given camera. The PSF is a measure for the quality of the given camera, as it reveals how at least one point is blurred in a given image captured by the given camera. The PSF allows for correction of out-of-focus blur in the given image, i.e., for deblurring the given image. If there is no out-of-focus blur, the given image need not require any deblurring and thus the PSF is centred about zero. The out-of-focus blur causes the PSF to move away from zero by an amount that is directly proportional to a shift in a pixel of the given image. Knowing the PSF is important for restoring sharpness of an (original) object with deconvolution in the given image. The PSF may be independent of a position in a plane of the object. The PSF of the given camera varies depending on a wavelength of light received by the given camera from the real-world environment. For example, a shorter wavelength of the light (for example, such as a blue light having a wavelength of 450 nanometres) result in a PSF that would be smaller than a PSF corresponding to a longer wavelength of the light (for example, such as a red light having a wavelength of 650 nanometres). The PSF may further depend on a numerical aperture (NA) of the lens (such as an objective lens) of the given camera. In an example, an objective lens having a higher NA may result in a smaller PSF as compared to an objective lens having a smaller NA. Moreover, the PSF may vary spatially across the lens. In other words, the PSF may vary across a field-of-view of the lens. This may be due to manufacturing tolerances of the lens which deteriorate the PSF towards edges of the lens. For example, a PSF for a point along an optical axis of the lens can be (slightly) different from a PSF for a point that is towards a periphery of the field-of-view of the lens. Thus, it is difficult to design a lens which projects a point to an image plane when moving from a centre of the lens towards an edge of the lens.

It will be appreciated that the PSF for the given camera could be pre-determined and pre-stored at the data repository. In an example, the PSF for the given camera is obtained by the at least one server as and when required (in real time or near-real time), from the data repository. A value of the PSF for the given camera is constant for a given focal length of the given camera or for a given aperture setting of the given camera. Alternatively, prior to obtaining the PSF, the at least one server is configured to generate the PSF as discussed hereinbelow.

Optionally, in the computer-implemented method, the step of obtaining the point spread function comprises:
- utilising the 3D model of the real-world environment to generate a reconstructed image from a perspective of the given camera pose; and
- determining the point spread function for the given camera as a function of optical depth, based on a correlation between at least a subset of pixels of the given image that is out of focus and respective pixels of the reconstructed image, and respective optical depths of at least the subset of the pixels in the reconstructed depth map.

In this regard, the reconstructed image is a visual representation of the real-world environment from the perspective of the given camera pose, said visual representation being generated using the 3D model.

Optionally, when utilising the 3D model to generate the reconstructed image, the at least one server is configured to employ the at least one data processing algorithm. Optionally, in this regard, the at least one data processing algorithm enables in transforming a 3D point in the 3D model to a 2D point in the reconstructed image, from the perspective of the given camera pose. Examples of the at least one data processing algorithm have already been discussed earlier. Generating the reconstructed image using the 3D model is well-known in the art.

Furthermore, the correlation between at least the subset of pixels of the given image and the respective pixels of the reconstructed image refers to a mathematical relation between pixel values of at least the subset of pixels of the given image and pixel values of the respective pixels. The aforesaid correlation could be determined by the at least one server using at least one: a mathematical formula, a mathematical function, a mapping between a given pixel of the subset and a respective pixel. Techniques for determining a correlation between pixels of different images are well-known in the art. One example of such a technique has been described hereinbelow. A person skilled in the art will recognize many variations, alternatives, and modifications of techniques for determining the PSF.

It will be appreciated that the determination of the PSF can be represented mathematically as follows:

In the Fourier domain:

blurred_image_FT=ideal_image_FT*PSF_FT(Multiplication)

wherein, * (a single asterisk) represents multiplication.

In other words, a Fourier transform of the blurred image is equal to a multiplication of a Fourier transform of the ideal image and a Fourier transform of the PSF.

Therefore, PSF_FT=blurred_image_FT/ideal_image_FT

PSF=inverseFT(blurred_image_FT/ideal_image_FT)

Thus, the PSF can be determined by applying an inverse Fourier transform to a division of the Fourier transform of the blurred image and the Fourier transform of the ideal image. Hereinabove, the "blurred image" refers to at least the subset of pixels that are out of focus in the given image, while the "ideal image" refers to the respective pixels of the reconstructed image that are in focus.

It will be appreciated that the pixels of the subset are those pixels which are represented in an image segment that is out of focus in the given image, thus the pixels of the subset can be considered to be out-of-focus pixels. Moreover, since the reconstructed image is generated using the 3D model, the reconstructed image has more accurate and in-focus visual representation throughout its field of view as compared the given image. Thus, pixels of the reconstructed image can be considered to be in-focus pixels, irrespective of whether the reconstructed image has a lower resolution, a similar resolution or a higher resolution as compared to the given image. This facilitates in accurately determining said correlation as defocussed image segment(s) of the given image can be compared with corresponding focused image segment(s) of the reconstructed image which is in-focus throughout its field of view. Furthermore, since the reconstructed depth map (that is generated from the 3D model) is readily available to the at least one server, the optical depths of at least the subset of the pixels can be accurately known by the at least one server for determining the PSF.

Moreover, optionally, the method further comprises updating the PSF by employing a neural network to predict a value of the PSF for a given optical depth based on values of the PSF for at least two optical depths that are determined based on said correlation. Herein, the neural network is used to improve accuracy of determining the PSF of the given camera, thereby improving a quality of EDOF correction. In this regard, the neural network is employed especially when values of PSF corresponding to only specific optical depths are known. It will be appreciated that the neural network may employ linear interpolation for predicting the value of the PSF for the given optical depth as an intermediate value of the values of the PSF for the at least two optical depths. Such an intermediate value could be one of: a median, an arithmetic mean, a weighted average, of the values of the PSF for the at least two optical depths. The neural network may also employ linear extrapolation for predicting the value of the PSF for the given optical depth. The aforesaid implementation for updating the PSF may be particularly beneficial in cases where PSFs can be determined for only a limited number of optical depths based on said correlation.

The neural network could also be employed for compensating manufacturing differences between a plurality of cameras that are manufactured on a same assembly line, based on manufacturing tolerances of the plurality of cameras. Herein, the term "manufacturing tolerance" refers to an amount of variation in camera parameters of a given camera, said variation being inherent while manufacturing the given camera. The technical benefit of using such manufacturing tolerances is that the neural network would be able to predict the value of the PSF in an expedite manner by converging on accurate values of the PSF, based on values of the manufacturing tolerances of the plurality of cameras.

Optionally, the method further comprises:
- identifying a plurality of image segments of the given image that represent different objects or different parts of the objects that are present in the real-world environment, the plurality of image segments being out of focus;
- computing weights for the plurality of image segments of the given image, wherein a weight of a given image segment is calculated based on at least one of:
  - a gradient of optical depth across the given image segment, a difference in optical depth between a given object represented in the given image segment and a neighbourhood of the given object in the given image segment, a contrast of features in an image segment of the reconstructed image corresponding to the given image segment; and selecting at least one image segment, from amongst the plurality of image segments of the given image, based on the weights computed for the plurality of image segments of the given image, wherein the subset of the pixels of the given image belong to the selected at least one image segment.

In an embodiment, when identifying the plurality of image segments that represent the different objects or their parts, the at least one server is configured to divide the given image into a plurality of image segments, based on spatial geometries of the different objects or their parts present in the real-world environment. In this way, the at least one server could easily identify an image segment corresponding to a given object or its part. Herein, the term "spatial geometry" relates to shapes and relative arrangements of the different objects or their parts present in the real-world environment. Optionally, the at least one server is configured to employ at least one computer vision algorithm in order to identify the spatial geometry of the different objects or their parts. In this regard, the at least one computer vision algorithm processes the given image to extract information pertaining to said spatial geometry therefrom. Such computer vision algorithms are well-known in the art. Additionally or alternatively, optionally, the at least one server is configured to train at least one convolutional neural network (CNN) using at least one deep learning algorithm for identifying the spatial geometry of the different objects or their parts.

In another embodiment, when identifying the plurality of image segments that represent the different objects or their parts, the at least one server is configured to extract a plurality of features from the given image. By extracting the plurality of features, the at least one server could easily identify at least a part of a given object. Examples of the plurality of features include, but are not limited to, edges, corners, blobs, ridges, high-frequency features (such as high frequency colour changes). Optionally, the at least one server is configured to employ at least one data processing algorithm for extracting the plurality of features from the given image. Examples of the at least one data processing algorithm include, but are not limited to, an edge-detection algorithm (for example, such as Canny edge detector, Deriche edge detector and the like), a corner-detection algorithm (for example, such as Harris & Stephens corner detector, Shi-Tomasi corner detector, Features from Accelerated Segment Test (FAST) corner detector and the like), a blob-detection algorithm (for example, such as Laplacian of Gaussian (LoG)-based blob detector, Difference of Gaussians (DoG)-based blob detector, Maximally Stable Extremal Regions (MSER) blob detector, and the like), a feature descriptor algorithm (for example, such as Binary Robust Independent Elementary Features (BRIEF), Gradient Location and Orientation Histogram (GLOH), Histogram of Oriented Gradients (HOG), and the like), a feature detector algorithm (for example, such as the SIFT, the SURF, Oriented FAST and rotated BRIEF (ORB), and the like). It will be appreciated that the at least one server need not identify the different objects or their parts in the given image, but only need to identify image segments of the given image that represent the different objects or their parts.

Furthermore, optionally, lesser the gradient of the optical depth across the given image segment, higher is the weight of the given image segment, and vice versa. This is because when a given object is represented in the given image segment and different parts of the given object are present at (almost) similar optical depths throughout the given image segment (i.e., optical depths of the different parts of the given object would lie within a predefined range from each other), the optical depths would have less interference with each other, across said image segment. The term "gradient" refers to a difference in the optical depth of the given object across the given image segment. Additionally, optionally, lesser the difference in the optical depth between the given object and the neighbourhood of the given object, higher is the weight of the given image segment. This is because when optical depths of the given object and the neighbourhood of the given object lie within a predefined range from each other, it is indicative of a flatness of the neighbourhood and the given object from the perspective of the given camera that has captured the given image. Herein, the term "flatness" refers to a two-dimensional nature of the given image segment due to a lack of any change in optical depth. Optionally, the predefined range lies in a range of 10 centimetres to 50 centimetres. As an example, the predefined range may be from 10 or 20 centimetres up to 25, 35 or 50 centimetres. More optionally, the predefined range lies in a range of 10 centimetres to 30 centimetres. Yet more optionally, the predefined range lies in a range of 10 centimetres to 20 centimetres. Optionally, higher the contrast of features in the image segment of the reconstructed image, higher is the weight of said image segment. This is because almost all objects represented in the reconstructed image are in-focus (as the reconstructed image is generated from the 3D model), and features of such objects are clearly represented in the reconstructed image, and thus are high in contrast.

Consequently, the weights computed for the plurality of image segments of the given image are prioritised in a descending order, and the given image segment having higher weight is selected to be the at least one image segment. In this manner, the correlation between the subset of the pixels of the given image and the respective pixels of the reconstructed image could be determined accurately, and thus the value of the PSF for the given camera is highly accurate.

For example, a given camera may have captured a blurred image of the real-world environment, wherein a given image segment of the blurred image represents a single bright spot on a surface of the real-world environment. The single bright spot in the given image segment may be surrounded by darker areas in a neighbourhood of the given image segment, wherein such darker areas are located at a similar distance as that of the single bright spot from the given camera. Hence, the gradient of the optical depth, and the difference in the optical depth between the single bright spot and the darker areas in the neighbourhood of the single bright spot may be determined to compute a weight for the given image segment. Such a bright spot may have a high-contrast feature in the image segment of the reconstructed image.

Throughout the present disclosure, the term "image segment" of a given image refers to a portion (namely, a segment) of the given image that represents a given object or its part present in the real-world environment. Furthermore, the term "extended depth-of-field correction" refers to a corrective image processing operation that emulates a visual effect of extension of the depth-of-field over which the objects or their parts in the real-world environment appear to be in-focus (i.e., well focused) in a given image.

Herein, the term "depth-of-field" refers to a distance between a nearest point and a farthest point in the real-world environment that are acceptably sharply focused in the given image captured by the given camera. The nearest point lies in front of a focus point (for example, such as an object) on which a lens of the given camera is actually focused, while the farthest point lies behind the focus point. The nearest point and the farthest point may be at an equal distance or at an unequal distance from the focus point. The depth-of-field may be determined based on at least one of: a focal length of the lens of the given camera, a distance between the object and the given camera, a pixel size, an aperture size, a transmission characteristic of an aperture, a number of apertures (i.e., in case of the given camera having multiple apertures). The extension of the depth-of-field does not sacrifice resolution or brightness, thereby clearly capturing the objects in the real-world environment without a need to adjust the focus of the given camera and an angle between the objects and the given camera. The EDOF correction enables deblurring of objects that lie outside of a focal region of the lens of the given camera (i.e., outside the depth-of-field of the lens of the given camera) to produce an extended-in-focus view of the real-world environment. The EDOF correction may be applied to capture in-focus images of at least one of: multiple objects present in at least a foreground and/or a background of a given object in the real-world environment, oblique objects, objects at different heights, objects at different depths.

When the at least one image segment of the given image is out of focus, this means that optical depths corresponding to the at least one image segment of the given image lie outside the focusing distance range of the given camera. Therefore, when the EDOF correction is applied to the at least one image segment of the given image, pixel values of the at least one image segment are corrected accordingly, by using the PSF for the given camera. Beneficially, upon applying the EDOF correction, the at least one image segment of the given image appears realistic and highly accurate as objects represented in the at least one image segment appear acceptably sharp (i.e., well focused and clearly visible). Thus, upon the EDOF correction, an immersive and realistic viewing experience could be provided to a user viewing the given image.

Optionally, the extended depth-of-field correction is applied by employing a Wiener filter to deconvolve the at least one image segment of the given image with the PSF determined for the given camera. In this regard, when an optical depth of each pixel of the at least one image segment of the given image is known along with the PSF for the given camera at said optical depth, a sharper version of the given image (namely, the EDOF-corrected given image) can be recovered from a blurred version of the given image. In such a case, the Wiener filter can be used for deconvolution effectively when a frequency characteristic of the at least one image segment of the given image and/or an additive noise in the at least one image segment of the given image are at least partially known. When the additive noise is absent in the at least one image segment, the Wiener filter is reduced to an ideal inverse filter. The aforesaid deconvolution process could be customised based on input provided by a user device associated with a user. Based on such input, at least one of: a noise-to-signal power value, an auto-correlation function, could be used to refine deblurring of the at least one image segment of the given image. Employing the Wiener filter for deblurring images is well-known in the art.

It will be appreciated that the step of applying the EDOF correction to the at least one image segment of the given image could be performed by using a neural network (for example, as discussed hereinbelow) which takes into account the PSF determined for the given camera. Thus, in such a case, said PSF is not used directly by the at least one server for the aforesaid EDOF correction, but is used by said neural network. It is to be understood that said neural network is different from the neural network that is used for updating the PSF, as discussed earlier.

It will be appreciated that the EDOF correction could also be applied by utilising at least one of: a defocus map estimation technique, a blind image deblurring deconvolution technique, a non-blind image deblurring deconvolution technique. These techniques are well-known in the art. The EDOF correction may be performed by employing a deblurring neural network implemented using deep learning techniques, in order to correct (i.e., deblur) the given image, outside a focal region of a lens of the given camera. One such deblurring neural network using deep learning techniques is described, for example, in "*EDoF-ToF: extended depth of field time-of-flight imaging*" by Jasper Tan, Vivek Boominathan et al., published in Optics Express, Vol. 29, Issue 23, pp. 38540-38556, November 2021, which has been incorporated herein by reference.

Optionally, the computer-implemented method further comprises:
   obtaining information indicative of a gaze direction of a user;
   determining a gaze region in the given image, based on the gaze direction of the user; and
   selecting the at least one image segment, from amongst a plurality of image segments of the given image that are out of focus, when the at least one image segment overlaps with the gaze region.

In this regard, the information indicative of the gaze direction of the user is received from the user device of the user, which comprises gaze-tracking means. The term "gaze-tracking means" refers to a specialized equipment for detecting and/or following gaze of the user (or specifically, user's eyes). The term "gaze direction" refers to a direction in which the user is gazing. The gaze direction may be indicated by a gaze vector. The gaze tracking means could be implemented as contact lenses with sensors, cameras monitoring a position, a size and/or a shape of a pupil of the user's eyes, and the like. Such gaze-tracking means are well-known in the art. It will be appreciated that the information indicative of the gaze direction of the user is received repeatedly from the gaze-tracking means, as gaze of the user keeps changing.

The term "gaze region" refers to a gaze-contingent area in the real-world environment whereat the gaze direction of the user is directed (namely, focused). The gaze region may depend on accuracy of the gaze-tracking means as well as a size of a natural human gaze region for an optical depth at which the user is gazing. It will be appreciated that when user's gaze is directed (namely, focused) towards a point or a region within the real-world environment, a gaze direction of a first eye and a gaze direction of a second eye of the user are different from each other, and both the gaze directions will converge at said point or said region. Since the gaze direction of the user in the real-world environment is known, the gaze region could be easily and accurately determined in given image. When the at least one image segment of the given image overlaps with the gaze region, it is beneficial to deblur the at least one image segment as compared to other image segments of the given image. Thus, the at least one server selectively applies the EDOF correction to the at least one image segment of the given image, so that the at least one image segment (representing gaze-contingent objects) could be perceived by the user with a high visual acuity. Beneficially, the user experiences high gaze-contingency and considerable realism upon viewing the given image upon the EDOF correction. In this manner, processing resources and processing time of the at least one server could be minimized because the EDOF correction is applied only when the at least one image segment overlaps with the gaze region. Thus, when the at least one image segment of the third image does not overlap (i.e., lies outside) with the gaze region, the EDOF correction need not be applied.

Optionally, the computer-implemented method further comprises:
- utilising the 3D model of the real-world environment to generate a reconstructed image from a perspective of the given camera pose;
- convolving the reconstructed image according to the point spread function determined for the given camera;
- comparing pixels of the at least one image segment of the given image with respective pixels of the convolved reconstructed image to detect whether any changes have occurred in a region of the real-world environment that is represented in the at least one image segment of the given image; and
- applying the extended depth-of-field correction to the at least one image segment of the given image, only when it is detected that no changes have occurred in said region of the real-world environment.

It will be appreciated that the reconstructed image is generated by the at least one server utilising the 3D model in a same manner as described earlier. When the reconstructed image is convolved, a quality of the reconstructed image is deliberately lowered to make it consistent with a quality of the given image in a manner that pixels of the convolved reconstructed image can be appropriately compared with respective pixels the given image. In other words, upon convolving, the convolved reconstructed image would be similar to the given image, and thus it is comparable with the given image for performing the aforesaid comparison of pixels.

It will be appreciated that convolving the reconstructed image according to the PSF can be represented mathematically as follows:

blurred_image=ideal_image**PSF(Convolution)

In other words, a blurred image is generated due to convolving of an ideal image with the PSF of the given camera. Hereinabove, the "blurred_image" refers to a convolved version of the reconstructed image (i.e., the convolved reconstructed image), whereas the "ideal image" refers to the reconstructed image that is generated using the 3D model.

It will be appreciated that any change in the region of the real-world environment may indicate a presence of a dynamic object in the real-world environment. It is to be understood that the dynamic object is an object present in the real-world environment whose properties (such as a pose, a shape, a size, and the like) change with respect to time. Examples of the dynamic object include, but are not limited to, a human, an animal, a robot.

Therefore, when pixel values of the pixels of the at least one image segment of the given image and pixel values of the respective pixels of the convolved reconstructed image are not considerably different (i.e., lie within a predefined colour threshold), it is detected that no (significant) changes have occurred in the region of the real-world environment. Therefore, the EDOF correction is applied to the at least one image segment of the given image. Conversely, when pixel values of the pixels of the at least one image segment of the given image and pixel values of the respective pixels of the convolved reconstructed image are considerably different (i.e., lie outside the predefined colour threshold), it is detected that some (significant) changes have occurred in the region of the real-world environment, for example, due to the presence of the dynamic object. Therefore, the EDOF correction is not applied to the at least one image segment of the given image as accurate optical depths pertaining to the dynamic object are not available in the 3D model. In this manner, the processing resources and the processing time of the at least one server could be saved as the at least one server selectively applies the EDOF correction to the at least one image segment of the given image.

It will be appreciated that the term "pixel value" of a given pixel encompasses colour value represented by the given pixel, and additionally optionally, at least one other attribute associated with the given pixel (for example, such as depth value, brightness value, transparency value, luminance value, and the like). As an example, the colour value could be an RGB value, an RGB-A value, an RGB-D value, an RGBW value, an RYYB value, an RGGB value, an RCCB values, an RGB-IR value, a Cyan-Magenta-Yellow-Black (CMYK) value, a Luminance and two-colour differences (YUV) value, or similar.

Optionally, when the pixel value is a colour value, the predefined colour threshold lies in a range of −20 percent to +20 percent of a dynamic range of colour values in the given image. More optionally, the predefined colour threshold lies in a range of −10 percent to +10 percent, or yet more optionally, in a range of −5 percent to +5 percent of the dynamic range of colour values in the given image. As an example, when a colour value of a pixel of the at least one image segment of the given image is 350 (i.e., when an RGB value is 50, 100, 200), and a colour value of a respective pixel of the convolved reconstructed image is 363 (i.e., when an RGB value is 48, 95, 220), the colour value of the pixel and the colour value of the respective pixel would lie within the predefined colour threshold.

The present disclosure also relates to the system and to the computer program product as described above. Various embodiments and variants disclosed above, with respect to the first aspect, apply mutatis mutandis to the system and to the computer program product.

Optionally, the at least one server is configured to obtain the point spread function determined for the given camera. Optionally, when obtaining the point spread function, the at least one server is configured to:
- utilise the 3D model of the real-world environment to generate a reconstructed image from a perspective of the given camera pose; and
- determine the point spread function for the given camera as a function of optical depth, based on a correlation between at least a subset of pixels of the given image and respective pixels of the reconstructed image, and respective optical depths of at least the subset of the pixels in the reconstructed depth map.

Optionally, the at least one server is further configured to update the point spread function by employing a neural network to predict a value of the point spread function for a given optical depth based on values of the point spread function for at least two optical depths that are determined based on said correlation.

Optionally, the at least one server is further configured to:
- identify a plurality of image segments of the given image that represent different objects or different parts of the objects that are present in the real-world environment, the plurality of image segments being out of focus;

compute weights for the plurality of image segments of the given image, wherein a weight of a given image segment is calculated based on at least one of:
- a gradient of optical depth across the given image segment,
- a difference in optical depth between a given object represented in the given image segment and a neighbourhood of the given object in the given image segment,
- a contrast of features in an image segment of the reconstructed image corresponding to the given image segment; and select at least one image segment, from amongst the plurality of image segments of the given image, based on the weights computed for the plurality of image segments of the given image, wherein the subset of the pixels of the given image belong to the selected at least one image segment.

Optionally, the at least one server is configured to apply the extended depth-of-field correction by employing a Weiner filter to deconvolve the at least one image segment of the given image with the point spread function determined for the given camera.

Optionally, the at least one server is further configured to:
obtain information indicative of a gaze direction of a user;
determine a gaze region in the given image, based on the gaze direction of the user; and
select the at least one image segment, from amongst a plurality of image segments of the given image that are out of focus, when the at least one image segment overlaps with the gaze region.

Optionally, the at least one server is further configured to:
utilise the 3D model of the real-world environment to generate a reconstructed image from a perspective of the given camera pose;
convolve the reconstructed image according to the point spread function determined for the given camera;
compare pixels of the at least one image segment of the given image with respective pixels of the convolved reconstructed image to detect whether any changes have occurred in a region of the real-world environment that is represented in the at least one image segment of the given image; and
apply the extended depth-of-field correction to the at least one image segment of the given image, only when it is detected that no changes have occurred in said region of the real-world environment

DETAILED DESCRIPTION OF THE DRAWINGS

Figure 1:
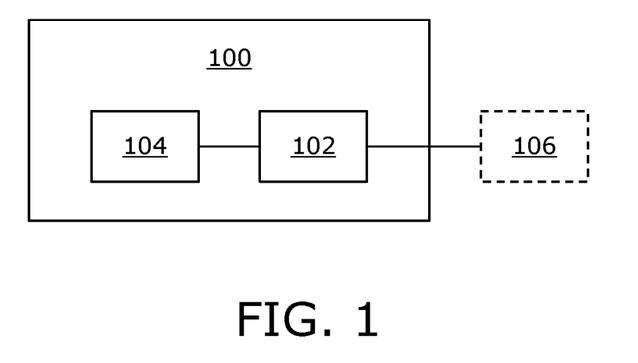
FIG. 1 illustrates a block diagram of a system for incorporating extended depth-of-field correction using reconstructed depth maps, in accordance with an embodiment of the present disclosure.

Referring to FIG. 1, illustrated is a block diagram of a system 100 for incorporating extended depth-of-field correction using reconstructed depth maps, in accordance with an embodiment of the present disclosure. The system 100 comprises at least one server (depicted as a server 102) and, optionally, a data repository 104 communicably coupled to the server 102. Optionally, the server 102 is communicably coupled to a camera 106 or to a device comprising the camera 106.

It may be understood by a person skilled in the art that FIG. 1 includes a simplified architecture of the system 100, for sake of clarity, which should not unduly limit the scope of the claims herein. It is to be understood that the specific implementation of the system 100 is provided as an example and is not to be construed as limiting it to specific numbers or types of servers, data repositories, and cameras. The person skilled in the art will recognize many variations, alternatives, and modifications of embodiments of the present disclosure.

Figure 2:
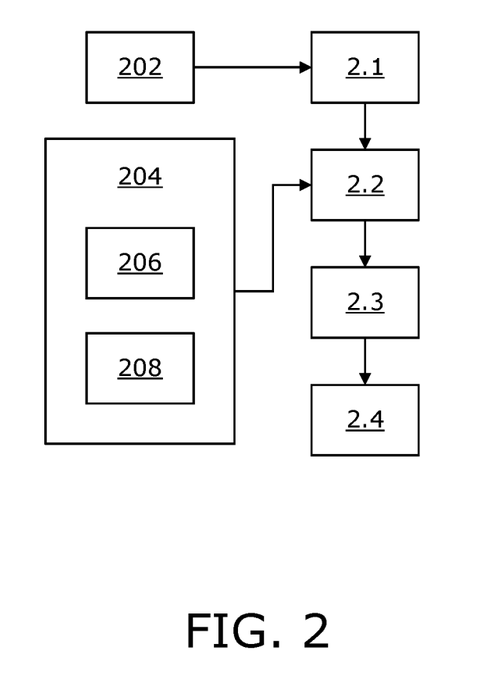
FIG. 2 illustrates an exemplary process flow for applying an extended depth-of-field correction on an image, in accordance with an embodiment of the present disclosure.

Referring to FIG. 2, illustrated is an exemplary process flow for applying an extended depth-of-field correction on an image, in accordance with an embodiment of the present disclosure. At step 2.1, a three-dimensional (3D) model of a real-world environment is generated by at least one server from a plurality of visible-light images and a plurality of depth maps (corresponding to the plurality of visible-light images), based on corresponding camera poses from which the plurality of visible-light images and the plurality of depth maps are captured, the plurality of visible-light images, the plurality of depth maps, and information pertaining to the corresponding camera poses is received from a device 202 comprising pose-tracking means, a visible-light camera, and a depth camera. At step 2.2, an image of the real-world environment captured using a camera and pose information indicative of a camera pose from which the image is captured, are received from a device 204 comprising pose-tracking means 206 and the camera 208. At step 2.3, the 3D model of the real-world environment is utilised to generate a reconstructed depth map from a perspective of the camera pose. At step 2.4, an extended depth-of-field correction is applied to an image segment of the image that is out of focus, by using the point spread function, based on optical depths in the segment of the reconstructed depth map corresponding to the image segment of the image.

Figure 3:
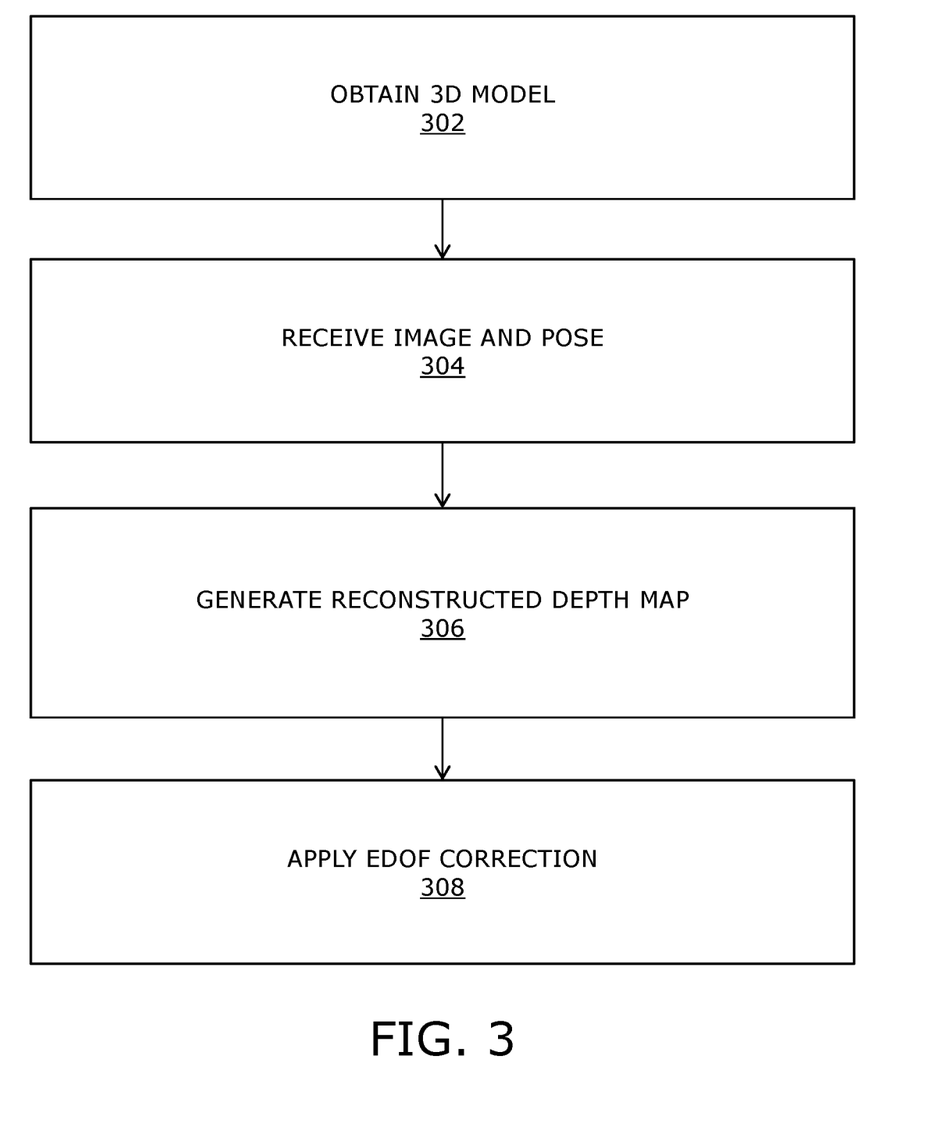
FIG. 3 illustrates steps of a computer-implemented method for incorporating extended depth-of-field correction using reconstructed depth maps, in accordance with an embodiment of the present disclosure.

Referring to FIG. 3, illustrated are steps of a computer-implemented method for incorporating extended depth-of-field correction using reconstructed depth maps, in accordance with an embodiment of the present disclosure. At step 302, a three-dimensional (3D) model of a real-world environment is obtained. At step 304, a given image of the real-world environment captured using a given camera, and pose information indicative of a given camera pose from which the given image is captured, are received. At step 306, the 3D model of the real-world environment is utilised to generate a reconstructed depth map from a perspective of the given camera pose. At step 308, an extended depth-of-field correction is applied to at least one image segment of the given image that is out of focus, by using a point spread function determined for the given camera, based on optical depths in at least one segment of the reconstructed depth map corresponding to the at least one image segment of the given image.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A computer-implemented method comprising:
obtaining a three-dimensional (3D) model of a real-world environment;

receiving a given image of the real-world environment captured using a given camera, and pose information indicative of a given camera pose from which the given image is captured;

utilising the 3D model of the real-world environment to generate a reconstructed depth map from a perspective of the given camera pose;

applying an extended depth-of-field correction to at least one image segment of the given image that is out of focus, by using a point spread function determined for the given camera, based on optical depths in at least one segment of the reconstructed depth map corresponding to the at least one image segment of the given image; and obtaining the point spread function determined for the given camera;

wherein the step of obtaining the point spread function comprises:
  utilising the 3D model of the real-world environment to generate a reconstructed image from a perspective of the given camera pose; and
  determining the point spread function for the given camera as a function of optical depth, based on a correlation between at least a subset of pixels of the given image that is out of focus and respective pixels of the reconstructed image, and respective optical depths of at least the subset of the pixels in the reconstructed depth map;

the computer-implemented method further comprising updating the point spread function by employing a neural network to predict a value of the point spread function for a given optical depth based on values of the point spread function for at least two optical depths that are determined based on said correlation.

2. The computer-implemented method of claim 1, further comprising:
  identifying a plurality of image segments of the given image that represent different objects or different parts of the objects that are present in the real-world environment, the plurality of image segments being out of focus;
  computing weights for the plurality of image segments of the given image, wherein a weight of a given image segment is calculated based on at least one of:
    a gradient of optical depth across the given image segment,
    a difference in optical depth between a given object represented in the given image segment and a neighbourhood of the given object in the given image segment,
    a contrast of features in an image segment of the reconstructed image corresponding to the given image segment; and
  selecting at least one image segment, from amongst the plurality of image segments of the given image, based on the weights computed for the plurality of image segments of the given image, wherein the subset of the pixels of the given image belong to the selected at least one image segment.

3. The computer-implemented method of claim 1, wherein the extended depth-of-field correction is applied by employing a Weiner filter to deconvolve the at least one image segment of the given image with the point spread function determined for the given camera.

4. The computer-implemented method of claim 1, further comprising:
  obtaining information indicative of a gaze direction of a user;
  determining a gaze region in the given image, based on the gaze direction of the user; and
  selecting the at least one image segment, from amongst a plurality of image segments of the given image that are out of focus, when the at least one image segment overlaps with the gaze region.

5. The computer-implemented method of claim 1, further comprising:
  utilising the 3D model of the real-world environment to generate a reconstructed image from a perspective of the given camera pose;
  convolving the reconstructed image according to the point spread function determined for the given camera;
  comparing pixels of the at least one image segment of the given image with respective pixels of the convolved reconstructed image to detect whether any changes have occurred in a region of the real-world environment that is represented in the at least one image segment of the given image; and
  applying the extended depth-of-field correction to the at least one image segment of the given image, only when it is detected that no changes have occurred in said region of the real-world environment.

6. A system comprising at least one server configured to:
  obtain a three-dimensional (3D) model of a real-world environment;
  receive a given image of the real-world environment captured using a given camera, and pose information indicative of a given camera pose from which the given image is captured;
  utilise the 3D model of the real-world environment to generate a reconstructed depth map from a perspective of the given camera pose;
  apply an extended depth-of-field correction to at least one image segment of the given image that is out of focus, by using a point spread function determined for the given camera, based on optical depths in at least one segment of the reconstructed depth map corresponding to the at least one image segment of the given image;
  wherein the at least one server is configured to obtain the point spread function determined for the given camera;
  wherein when obtaining the point spread function, the at least one server is configured to:
    utilise the 3D model of the real-world environment to generate a reconstructed image from a perspective of the given camera pose; and
    determine the point spread function for the given camera as a function of optical depth, based on a correlation between at least a subset of pixels of the given image that is out of focus and respective pixels of the reconstructed image, and respective optical depths of at least the subset of the pixels in the reconstructed depth map;
  wherein the at least one server is further configured to update the point spread function by employing a neural network to predict a value of the point spread function for a given optical depth based on values of the point spread function for at least two optical depths that are determined based on said correlation.

7. The system of claim 6, wherein the at least one server is further configured to:
  identify a plurality of image segments of the given image that represent different objects or different parts of the objects that are present in the real-world environment, the plurality of image segments being out of focus;

compute weights for the plurality of image segments of the given image, wherein a weight of a given image segment is calculated based on at least one of:
a gradient of optical depth across the given image segment,
a difference in optical depth between a given object represented in the given image segment and a neighbourhood of the given object in the given image segment,
a contrast of features in an image segment of the reconstructed image corresponding to the given image segment; and
select at least one image segment, from amongst the plurality of image segments of the given image, based on the weights computed for the plurality of image segments of the given image, wherein the subset of the pixels of the given image belong to the selected at least one image segment.

8. The system of claim 6, wherein the at least one server is configured to apply the extended depth-of-field correction by employing a Weiner filter to deconvolve the at least one image segment of the given image with the point spread function determined for the given camera.

9. The system of claim 6, wherein the at least one server is further configured to:
obtain information indicative of a gaze direction of a user;
determine a gaze region in the given image, based on the gaze direction of the user; and
select the at least one image segment, from amongst a plurality of image segments of the given image that are out of focus, when the at least one image segment overlaps with the gaze region.

10. The system of claim 6, wherein the at least one server is further configured to:
utilise the 3D model of the real-world environment to generate a reconstructed image from a perspective of the given camera pose;
convolve the reconstructed image according to the point spread function determined for the given camera;
compare pixels of the at least one image segment of the given image with respective pixels of the convolved reconstructed image to detect whether any changes have occurred in a region of the real-world environment that is represented in the at least one image segment of the given image; and
apply the extended depth-of-field correction to the at least one image segment of the given image, only when it is detected that no changes have occurred in said region of the real-world environment.

11. A computer program product comprising a non-transitory machine-readable data storage medium having stored thereon program instructions that, when executed by a processor, cause the processor to execute steps of a computer-implemented method of claim 1.

* * * * *